United States Patent
Joyce et al.

(10) Patent No.: US 9,981,686 B2
(45) Date of Patent: May 29, 2018

(54) CREEP ASSIST FOR STEERING MANAGEMENT

(71) Applicant: Ford Global Technologies, LLC, Dearborn, MI (US)

(72) Inventors: John P. Joyce, Bloomfield, MI (US); David Jeffeory Berels, Plymouth, MI (US); Eric She, Troy, MI (US); Michael Edward Brewer, Dexter, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days. days.

(21) Appl. No.: 15/252,646

(22) Filed: Aug. 31, 2016

(65) Prior Publication Data

US 2018/0057048 A1    Mar. 1, 2018

(51) Int. Cl.
*B62D 6/04* (2006.01)
*B62D 3/12* (2006.01)
*B62D 11/02* (2006.01)
*B62D 11/00* (2006.01)

(52) U.S. Cl.
CPC .............. *B62D 6/04* (2013.01); *B62D 3/126* (2013.01); *B62D 11/003* (2013.01); *B62D 11/02* (2013.01)

(58) Field of Classification Search
None
See application file for complete search history.

(56) References Cited

U.S. PATENT DOCUMENTS

| 7,245,995 | B2 | 7/2007 | Kueperkoch et al. |
| 9,063,546 | B2 | 6/2015 | Hauler et al. |
| 9,211,912 | B2 | 12/2015 | Niemz |
| 2002/0105423 | A1 | 8/2002 | Rast |
| 2008/0084286 | A1 | 4/2008 | Teramura et al. |
| 2014/0083793 | A1* | 3/2014 | Osterberg .............. B62D 5/065 180/441 |
| 2015/0073664 | A1 | 3/2015 | Petridis et al. |
| 2015/0336606 | A1 | 11/2015 | Shibuya et al. |

FOREIGN PATENT DOCUMENTS

| DE | 102012014991 A1 | 2/2013 |
| DE | 102014013173 A1 | 4/2015 |
| DE | 102014212289 A1 | 12/2015 |
| JP | H0560224 A | 3/1993 |

OTHER PUBLICATIONS

UK Search Report dated Jan. 12, 2018 re: GB Appl. No. 1713485.9.

* cited by examiner

*Primary Examiner* — Mussa A Shaawat
*Assistant Examiner* — Kyung J Kim
(74) *Attorney, Agent, or Firm* — Frank A. MacKenzie; Bejin Bieneman PLC (57) ABSTRACT

Controlling a vehicle steering system includes determining a rack position of a rack needed to execute a maneuver. A minimum velocity allowing the desired steering angle to be reached is determined. The velocity of the vehicle is increased to the determined minimum velocity. The rack is moved to the rack position needed.

20 Claims, 6 Drawing Sheets

CREEP ASSIST FOR STEERING MANAGEMENT

BACKGROUND

Autonomous vehicle steering control relies at least in part on an expected vehicle response based on predetermined inputs to the steering system. It is expected that the vehicle will execute steering maneuvers associated with parking. A problem arises, however, when an expected turning radius cannot be achieved. Such diminished steering system performance may cause an autonomous vehicle to perform in a manner inconsistent with control system commands that presume a fully functional steering system. Diminished steering performance may render certain steering maneuvers not possible, particularly when the vehicle is stationary and steering loads are high.

DETAILED DESCRIPTION

Introduction

A system includes a computing device that includes a processor and a memory. The memory stores instructions executable by the processor. According to certain instructions the computing device is programmed to determine a rack force needed to displace a steering rack of a vehicle. The computing device is further programmed to determine a rack force available from a steering actuator. The computing device is further programmed to, when the force available is less than the force needed, initiate vehicle movement. The computing device is further programmed to activate the actuator when the vehicle is in motion.

Relative orientations and directions (by way of example, upper, lower, bottom, rearward, front, rear, back, outboard, inboard, inward, outward, lateral, let, right) are set forth in this description not as limitations, but for the convenience of the reader in picturing at least one embodiment of the structures described. Such exemplary orientations are from the perspective of an occupant seated in a driver seat, facing a dashboard.

Exemplary System Elements

Figure 1:
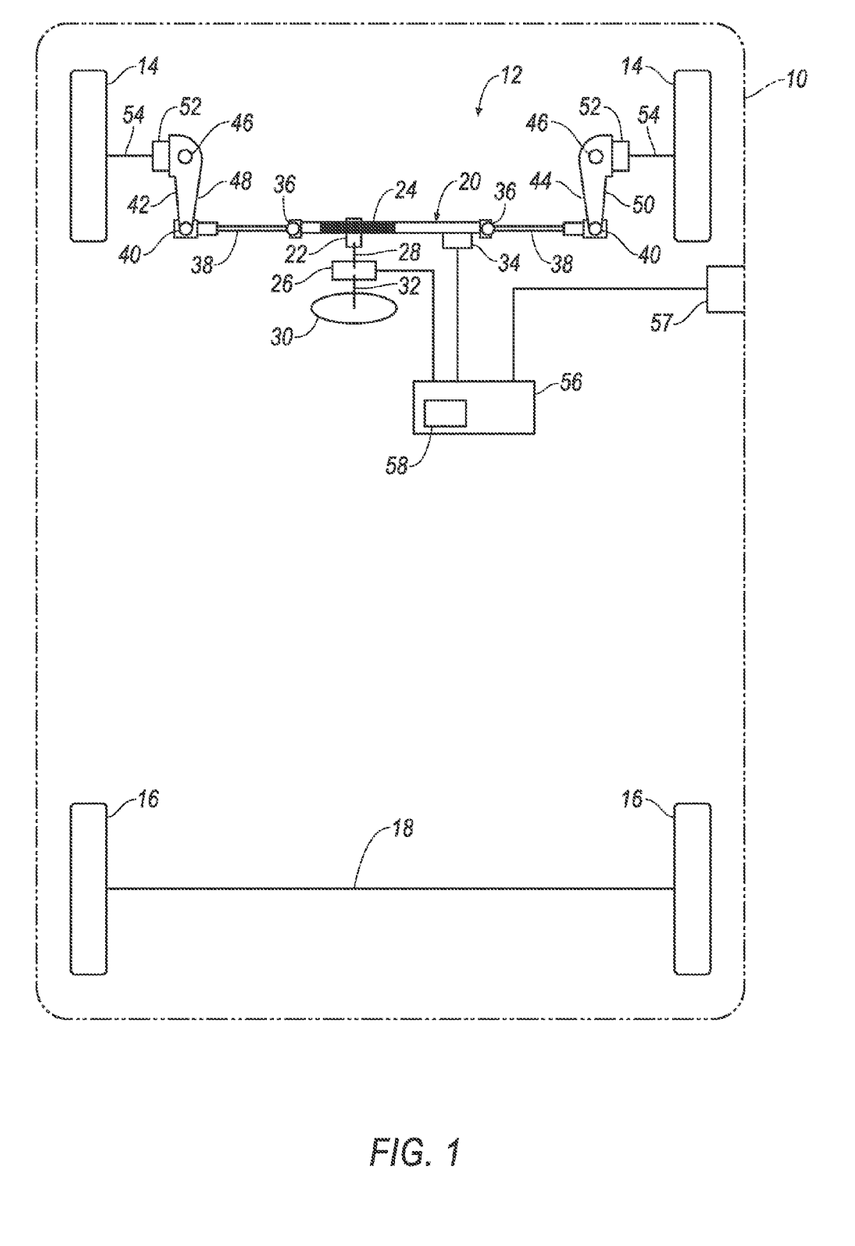
FIG. 1 is a schematic view of a vehicle including an exemplary steering system with the front wheels in a first orientation.

FIG. 1 illustrates an exemplary vehicle 10 having an exemplary steering system 12. Front wheels 14, each wheel 14 typically have a tire mounted thereon, are connected to steering system 12. Steering system 12 may be connected in part directly to a vehicle 10 structure, such as a vehicle 10 body or a vehicle 10 frame or subframe, all of which are well known. Steering system 12 may also be connected in part to a vehicle 10 front suspension which commonly includes a lower control arm (not shown). Vehicle 10 also includes rear wheels 16, each also typically including a tire, which may be attached to a rear axle 18. Rear axle 18 may be connected to a rear portion of the vehicle 10 structure such as a rear portion of the vehicle 10 body or the vehicle 10 frame or subframe by a rear suspension (not shown). In alternative configurations, such as with an independent rear suspension, a rear axle may not be included and the rear wheels 16 may be mounted to rear suspension knuckles through wheel bearings. The rear suspension and wheel mounting are not critical to the presently described steering system.

Figure 3:
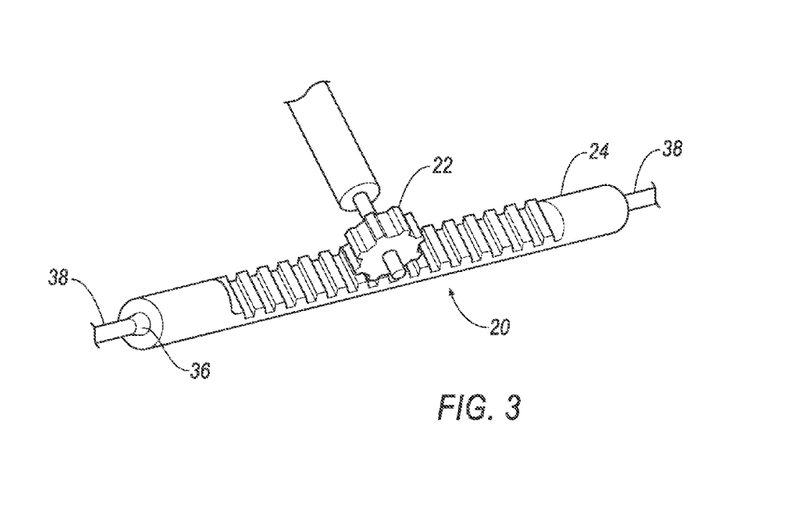
FIG. 3 is a perspective view of an exemplary rack and pinion steering gear arrangement.

A rack and pinion steering gear 20 is included as part of steering system 12. Steering gear 20 includes a pinion gear 22 and a rack 24 as best shown in FIG. 3. A steering actuator 26 is drivingly connected to pinion gear 22 by a lower steering column 28. A steering wheel 30 may be connected to lower steering column 28 through an upper steering column 32 and steering actuator 26. Steering wheel 30 and upper steering column 32 may be omitted in a completely autonomous vehicle. A rack displacement transducer or sensor 34 may be connected in part to rack 24 for measuring a lateral displacement of rack 24. Rack displacement sensor 34 may be in the form of a rotation sensor associated with pinion gear 22, as displacement of rack 24 will vary linearly with rotation of pinion gear 22. Sensor 34 may be used to determine both a displacement of rack 24 and a velocity of displacement of rack 24.

Inner tie rod ball joints 36 at opposite ends of rack 24 may pivotably connect tie rods 38 to rack 24. Outer tie rod ball joints 40 may pivotably connect tie rods 38 to a left steering knuckle 42 on a left side of steering system 12 and to a right steering knuckle 44 on a right side of steering system 12. Knuckles 42 and 44 may each be respectively pivotably connected by a suspension ball joint 46 to a left lower control arm (not shown) and a right lower control arm (not shown). The control arms comprise part of the front suspension and are connected to the vehicle structure. Left knuckle 42 may have a left steering arm 48 extending between the left side outer tie rod ball joint 40 and suspension ball joint 46. Right knuckle 44 may have a right steering arm 50 extending between the right side outer tie rod ball joint 40 and suspension ball joint 46. A wheel bearing 52 is mounted to each of knuckles 42 and 44. A spindle 54 is rotatably supported by each bearing 52, allowing rotation of spindle 54 relative to knuckles 42 and 44. Spindles 54 are each rotatably fixed to one of front wheels 14.

Figure 2:
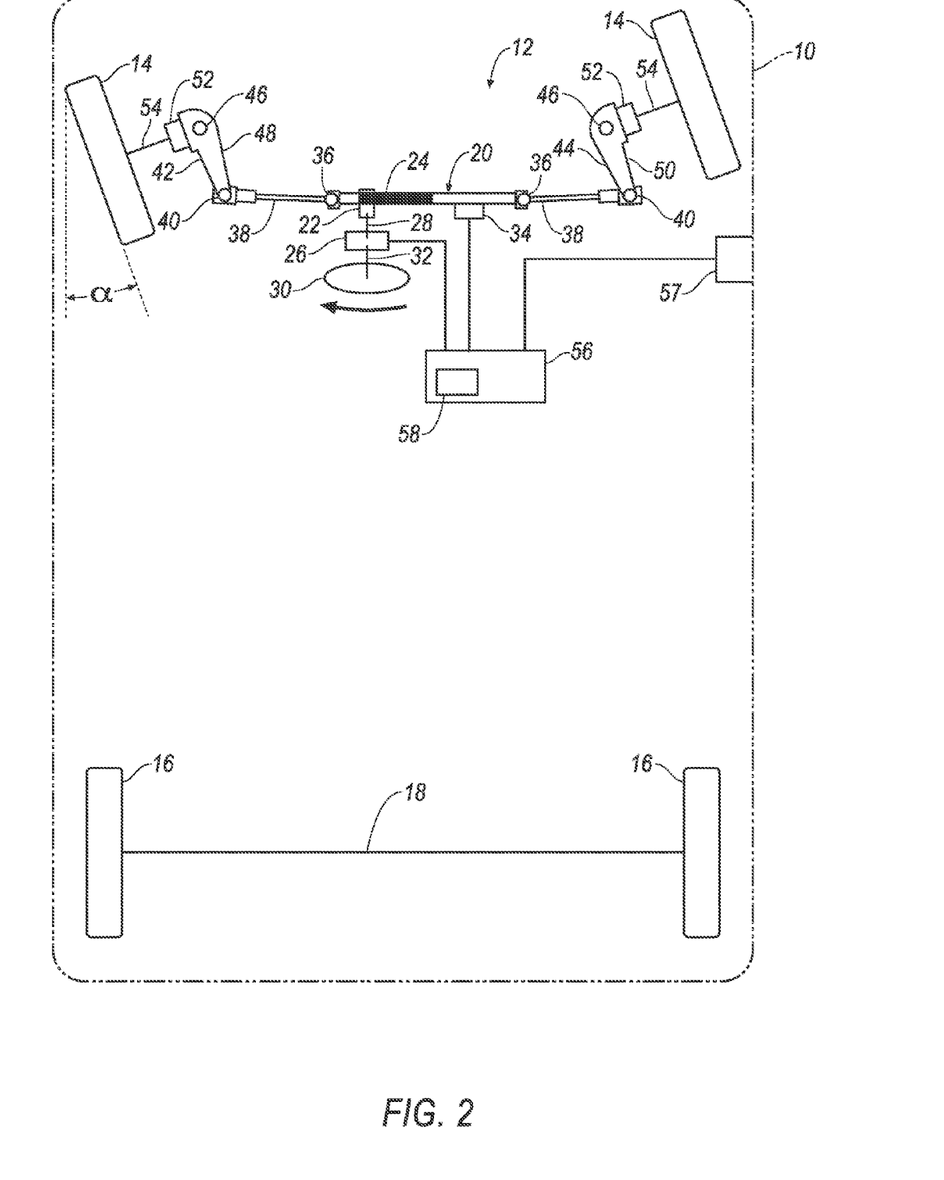
FIG. 2 is a schematic view of the vehicle and steering system of FIG. 1 with the front wheels in a second steering orientation.

Rotation of lower steering column 28 pivots knuckles 42, 44 and wheels 14. Rotation of lower steering column 28, through the engagement of pinion gear 22 and rack 24, laterally displaces rack 24. Lateral displacement of rack 24 displaces tie rods 38 which pivot steering arms 48 and 50 of knuckles 42 and 44 about ball joints 46. Knuckles 42, 44 may be additionally pivotably supported by upper ball joints mounted to upper control arms (not shown) or to a strut assembly (not shown) in a known manner. Wheels 14 are pivoted about ball joints 46 responsive to the displacement of the steering knuckle steering arms 48, 50. FIG. 1 illustrates wheels 14 and steering system 12 in a first orientation with wheels 14 in a straight-ahead orientation for driving vehicle 10 in a straight line. FIG. 2 illustrates wheels 14 and steering system in a second orientation with wheels 14 in a left-turn orientation for driving vehicle 10 in a left-directed arc. The inside or left wheel 14 is illustrated as being positioned at an angle α to the straight-ahead position of FIG. 1. The left or inside wheel 14 in FIG. 1 has a steering angle α of 0°. The angle of the right wheel in FIG. 2 may be less than the angle of the left wheel for a left turn, as the outboard tire will be tracking a slightly larger radius than the inside tire to avoid tire scrubbing. Such a variation in steering angle α is known, and may be provided by an exemplary Ackerman linkage as is known. Steering angle α varies directly with lateral displacement of rack 24 as a function of the geometry of the linkage.

Static steering loads or steering loads when a vehicle is stationary may be very high. An entire weight of vehicle 10 is supported by wheels 14 and 16. Front wheels 14 may be loaded more heavily than rear wheels 16 when vehicle 10 has its drive motor or motors located in a front end. Pivoting or steering of wheels when the vehicle is not moving induces some scrubbing or dragging of the wheel's tires over pavement engaged by the tires. A rubber-to-cement interface may have a high coefficient of friction, not uncommonly close to a value of one. Pivoting or steering wheels 14 requires displacement of steering arms 48 and 50 by rack 24. The force required from rack 20 to move arms 48 and 50 and pivot wheels 14 is identified as the rack force. An available rack force depends on an available actuator torque. Rack force varies substantially linearly with actuator torque as a function of the ratio of pinion gear 22 turns relative to rack 24 displacement.

An on-board computer 56, alternatively referred to as a controller or an electronic control unit ("ECU") may be electrically connected to each of actuator 26 and transducer 34. ECU 56 selectively allows selective connection of actuator to a source of electrical power. ECU 56 may be directly connected to actuator 26 or may be connected indirectly to actuator 26. An example indirect connection is connecting ECU 56 to a power relay (not shown) that is connected to actuator 26. Such power relays may be in the form of digital power relays, or solid state relays incorporating discrete electronic elements including transistors or electromechanical relays. The design of such relays or relay switches is known in the art. Sources of electrical power may include a battery, an alternator, and a direct current motor-generator.

Steering system 12 must provide some redundancy to preserve an ability, albeit a potentially diminished ability, to maneuver the vehicle in the event actuator 26 becomes compromised. Steering actuator 26 may be configured to provide such redundancy to allow the operation of the vehicle in a diminished steering mode. Actuator 26 may, by way of example, include an electric motor having two separate sets of windings. A shaft from the motor may be drivingly connected to the pinion gear 22. In a fully functional or regular or normal mode of operation, both sets of windings may be energized and may be used to supply torque to lower steering column 28. In a diminished mode of operation, only one set of windings may be operable and actuator 26 may only be able to provide half of the torque available in the regular mode of operation.

Alternatively, actuator 26 may include two separate electric motors that are each connected to and received directions from ECU. Each motor may have its own set of windings. Collectively, actuator 26 may have two sets of windings.

Yet further alternatively, redundancy may be in the form of overlapping complementary systems (not illustrated) in which torque from an actuator of each system is required to achieve full steering assist torque, and the separate actuators are coordinated by ECU 56 to operate as a single integrated actuator.

Exemplary actuator 26 is sized to provide sufficient torque assist capability for relatively high-assist circumstances, such as static parking and high lateral acceleration cornering with high steering wheel angle rate. When operating in a diminished or limp-home mode of operation, the ability to execute such maneuvers may be restricted. An exemplary limp-home mode of operation may comprise using just one of the motors. An alternative limp-home mode of operation may comprise using both motors at a reduced level of power. In either case, the power available for adjusting steering wheel position in the diminished mode of operation is reduced.

The ECU 56 includes programming to autonomously operate the vehicle 10, e.g., a virtual driver 58 as is known. For purposes of this disclosure, an autonomous mode, i.e., autonomous operation by the virtual driver 58, is defined as one in which each of vehicle 10 propulsion, braking, and steering are controlled by the virtual driver 58; in a semi-autonomous mode the virtual driver 58 controls one or two of vehicle 10 propulsion, braking, and steering. ECU 56 includes at least one electronic processor and an associated memory. The memory includes one or more forms of computer-readable media, and stores instructions executable by the processor for performing various operations, including such operations as disclosed herein.

The memory of ECU 56 also stores data. Data may include collected data that is collected from a variety of devices. In general, collected data may include any data that may be gathered by any data collection device 30 including sensors and/or computed from such data. Exemplary collection devices 30 may include transducer 34, actuator 26, a lateral acceleration sensor 57, and autonomous driving sensors such as a radar sensor, a lidar sensor, a vision sensor and the like. The foregoing examples are not intended to be limiting. Other types of data collection devices may be used to provide data to ECU 56. Data may also include calculated data calculated in ECU 56 from collected data and from other calculated data.

The memory of ECU 56 stores data received via various communications mechanisms. ECU 56 may be configured for communications on a vehicle network such as an Ethernet network or a controller area network ("CAN") bus or the like, and/or for using other wired or wireless protocols, e.g., Bluetooth®, Bluetooth® Low Energy, or WiFi. ECU 56 may also have a connection to an onboard diagnostics connector such as an OBD-II connector. Via the CAN bus, OBD-II, Ethernet, and/or other wired or wireless mechanisms, ECU 56 may transmit messages to various devices in a vehicle and/or receive messages from the various devices, e.g., controllers, actuators, sensors, switches, etc. as discussed herein. Although ECU 56 is shown as a single ECU in FIG. 1 and FIG. 2 for ease of illustration, it is to be understood that ECU 56 could in fact include and various operations described herein could be carried out by one or more computing devices, e.g., vehicle component controllers such as are known and/or a computing device dedicated to the system 12.

The virtual driver 58 for autonomous driving sends actuation requests for vehicle 12 to follow a path curvature at certain velocity. When the steering system is fully functional and steering actuator 26 is properly sized, an available path curvature is limited at low vehicle speeds primarily by steering system geometry and is limited at high vehicle speeds primarily by vehicle dynamic stability properties.

It is desirable for the virtual driver 58 to know both the regular or full capability of steering actuator 26 and the more limited capability of steering actuator 26 operating in the diminished mode to allow execution of maneuvers such as parallel parking. Commonly, as noted above, with steering actuator 26 operating in its normal mode, vehicle parking maneuvers are limited by steering system geometry and an associated vehicle turning radius rather than torque limitations of the steering actuator 26. However, execution of such maneuvers in the diminished mode of operation may instead be limited by the reduced capabilities of actuator 26. The execution of such maneuvers may require more torque from actuator 26 than actuator 26 is able to provide when it is operating in the reduced power or diminished mode of operation.

The capability of steering system 12 and steering actuator 26 to handle such maneuvers may be aided by inducing low speed, e.g., 5 kilometers per hour or less, vehicle motion, sometimes referred to as "creep." Such vehicle motion may reduce the tire-to-pavement scrubbing, in turn reducing a rack force needed to pivot knuckles 42, 44 and wheels 14 relative to the rack force needed to pivot the knuckles and wheels with vehicle 10 stationary. Management of such steering system creep aid is described below.

Processing

Figure 4:
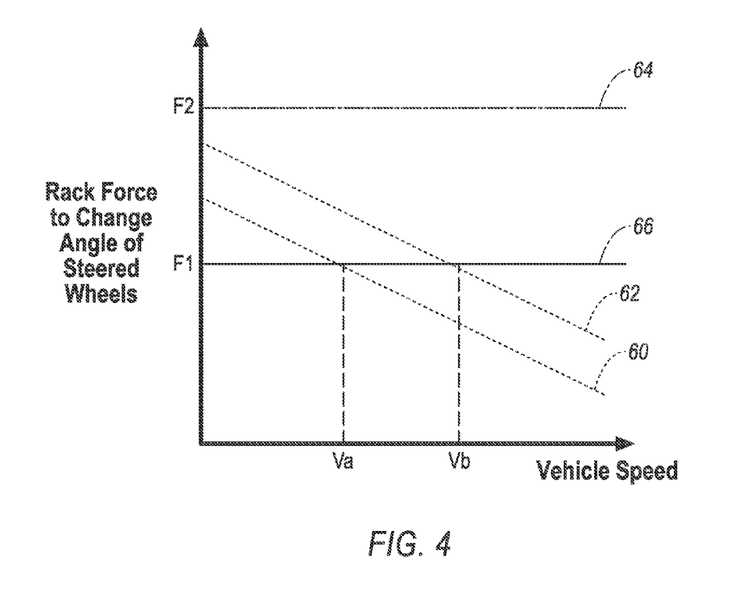
FIG. 4 is an exemplary plot of steering rack force as a function of vehicle velocity.

In an exemplary operation illustrated in FIG. 4, steering system 12 compensates for a loss of available torque from actuator 26 by increasing vehicle speed above a velocity Va. FIG. 4 is an exemplary plot of steering rack force needed to displace steering rack 24 as a function of vehicle velocity. An exemplary lower range of rack force 60 needed to displace steering rack 24 decreases with vehicle speed. An exemplary upper range of rack force 62 needed to displace steering rack 24 is substantially parallel to lower range of rack force 60 and also decreases with speed. The vehicle speed range illustrated in FIG. 4 is low, as might be associated with low speed parking maneuvers. Lower range 60 and upper range 62 may both reach plateaus (not shown) at a value above a force of zero.

FIG. 4, including ranges 60 and 62 and the gap therebetween, provides a simplified 2-dimensional representation of a more complex relationship that depends on many factors. Such factors may include, by way of example and not limitation, variables such as the magnitude of turning or pivoting of wheels 14, the ambient temperature, the amount of moisture on the pavement, whether the surface is paved, if paved then the type of pavement surface material, and the characteristics of the tires. The magnitude of the separation may be increased or decreased by varying the magnitude of the above-cited environmental variables, and by adding or subtracting additional factors. Ranges 60 and 62 and the associated relationship between vehicle velocity and needed rack force may be determined based on computer models of vehicle 10 and steering system 12, and may be alternatively determined by instrumenting vehicle 10 and steering system 12 to measure rack force and steering angle α and vehicle velocity. Determining ranges 60 and 62 allows the determination of rack force needed to displace steering rack 24.

A value of a full or normal rack force F2 available from actuator 26 when actuator is fully operational is illustrated by horizontal line 64. A diminished force F1 available from actuator 26 in a diminished condition is illustrated by horizontal line 66. FIG. 4 shows an exemplary relationship between vehicle speed and the steering rack force in comparison with a maximum available rack force F2. ECU 56 may determine an available torque, and thus an available rack force, from steering actuator 26. ECU 56 may at least determine whether actuator 26 is operating in its regular mode or the diminished mode, and having made such determination, determine an available torque from actuator 26 and an associated rack force.

Under normal operation of actuator 26, actuator 26 may develop a rack force of up to force F2. During normal operation, as illustrated in FIG. 4, the steering system actuator torque capability generates rack force F2 which exceeds the maximum anticipated rack force 62 for all vehicle speeds across all conditions. With a rack force of F2 being available for steering, no control of vehicle speed is needed to enable steering knuckle and wheel pivoting to change steering angle α. In a diminished mode of operation, steering actuator 26 may develop only enough torque for a rack force of up to F1.

Diminished operation may result from any number of causes including, by way of example and not limitation, a partial failure in the steering system actuator 26, partial loss of power supplied to the steering system actuator, and overheating of the steering system, particularly the motor or motors of the actuator 26. In the diminished operation mode, actuator 26 may not have sufficient torque capacity to generate a rack force sufficient to pivot wheels 14 for all conditions of operation, particularly if vehicle 10 is not moving.

As illustrated in FIG. 4, line 66 intersects line 60 at a vehicle speed value of Va, and intersects line 62 at a vehicle speed of Vb. Depending on conditions, actuator 26 may not be able to provide enough torque and rack force to allow steering vehicle 10 below velocity Vb. To initiate a maneuver when the rack force available is less than the rack force needed, vehicle movement is initiated. To complete a maneuver, particularly a parking maneuver, vehicle velocity may be coordinated with steering angle α and the associated rack position to allow the steered wheels 14 to be pivoted. When ECU 56 is provided with data indicative of the conditions influencing the gap between lines 60 and 62, vehicle speed may be further modulated to optimize performance and use actuator at speeds between Va and Vb when possible.

Steering control may also be based on dynamic response. For example, a maximum available actuator force may be applied to rack 24, and then the vehicle speed may be increased until the steering angle α begins to change. When a change in steering angle α is detected, the vehicle speed is modulated to achieve the desired steering angle α and rack displacement.

Figure 5:
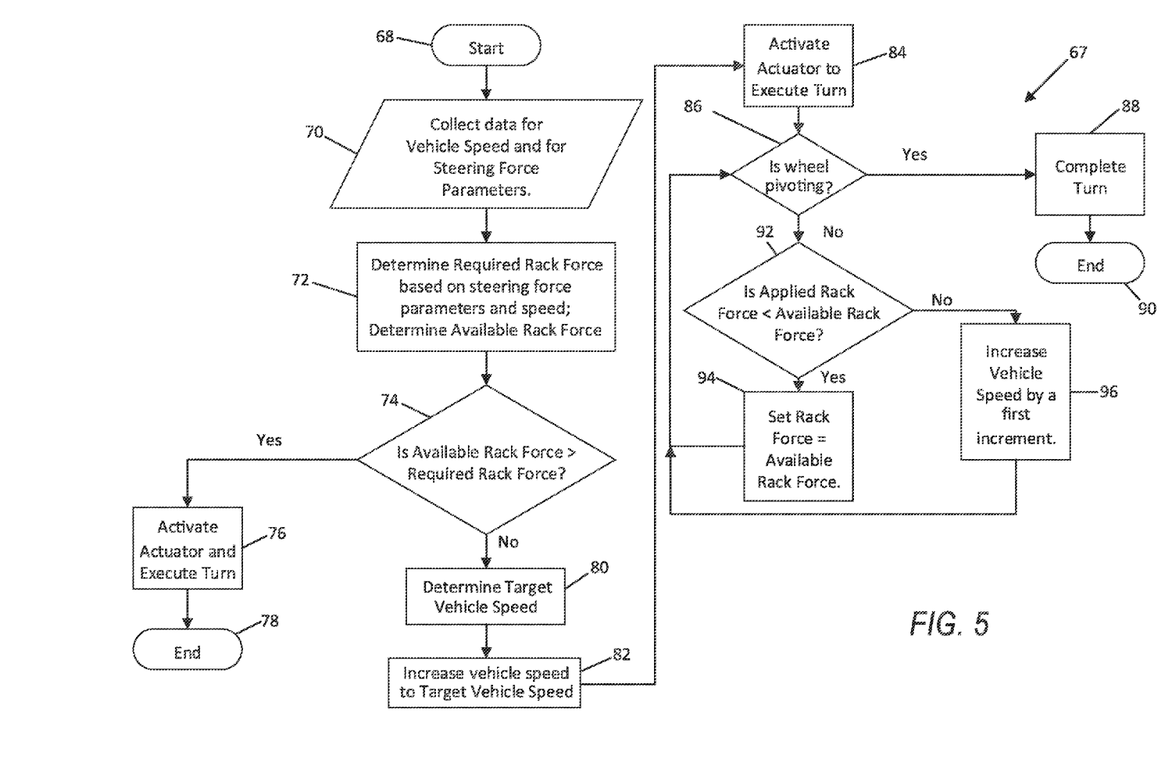
FIG. 5 is exemplary flow chart of logic for steering a vehicle employing vehicle movement to supplement a steering actuator operating in a diminished mode.

In FIG. 5, a logic diagram or flowchart 67 provides an exemplary illustration of how the above method may be executed. The logic is initiated in start block 68. In block 70, data may be collected from sensors including a vehicle speed sensor (not shown) and sensors that may be used to estimate a required magnitude of rack for to execute a maneuver and the available rack force from actuator 26, including, by way of example, rack displacement transducer 34, lateral acceleration sensor 57 and a current sensor associated with actuator 26.

In process block 72, the required steering rack force and the available steering rack force are determined using data from block 70. Decision block 74 assesses and determines whether the available rack force is greater than the required rack force. If yes, then actuator 26 is activated to make the desired turn or maneuver in accord with process block 76, and the logic is then concluded at end block 78. If no, then process block 80 may determine a target vehicle speed, an exemplary target vehicle speed being Va.

The vehicle speed may then be increased to the target vehicle speed in accord with process block 82. The actuator 26 may then be activated to execute the turn or maneuver.

Decision block 86 may check for movement of rack 24 using data from sensor 34 to determine whether at least one of wheels 14 are pivoting relative to ball joint 46. If yes, then process block 88 of logic 67 directs completion of the turn or maneuver, followed by termination of logic 67 at end block 90. If wheel 14 is not pivoting, logic 67 checks to determine if the applied rack force is less than the available rack force. If yes, then the rack force is set equal to the available rack force such as F1 and logic 67 then circles back to decision block 86 to determine if wheel 14 is pivoting. If the applied rack force is not less than the available rack force, then the vehicle speed is increased by a first increment of speed, and the logic 67 is circled back to decision block 86 to determine if wheel 14 is pivoting yet. If not, the logic then cycles through decision block 92 and again increases vehicle speed by the incremental amount. Increases in speed may be constrained by an effect of speed changes on the position of the vehicle 10. Additionally, vehicle motion may be either in a forward or a rearward direction. The horizontal axis for vehicle speed of FIG. 4 may be interpreted as being an absolute value for low vehicle speeds.

Figure 6:
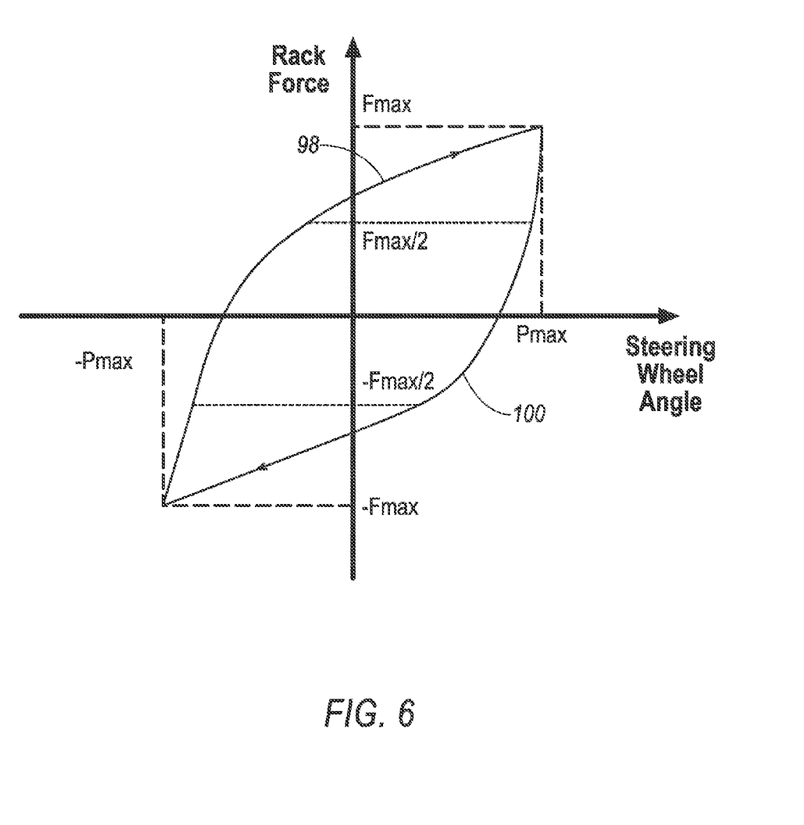
FIG. 6 is an exemplary plot of steering rack force as a function of steering wheel angle.
Figure 7:
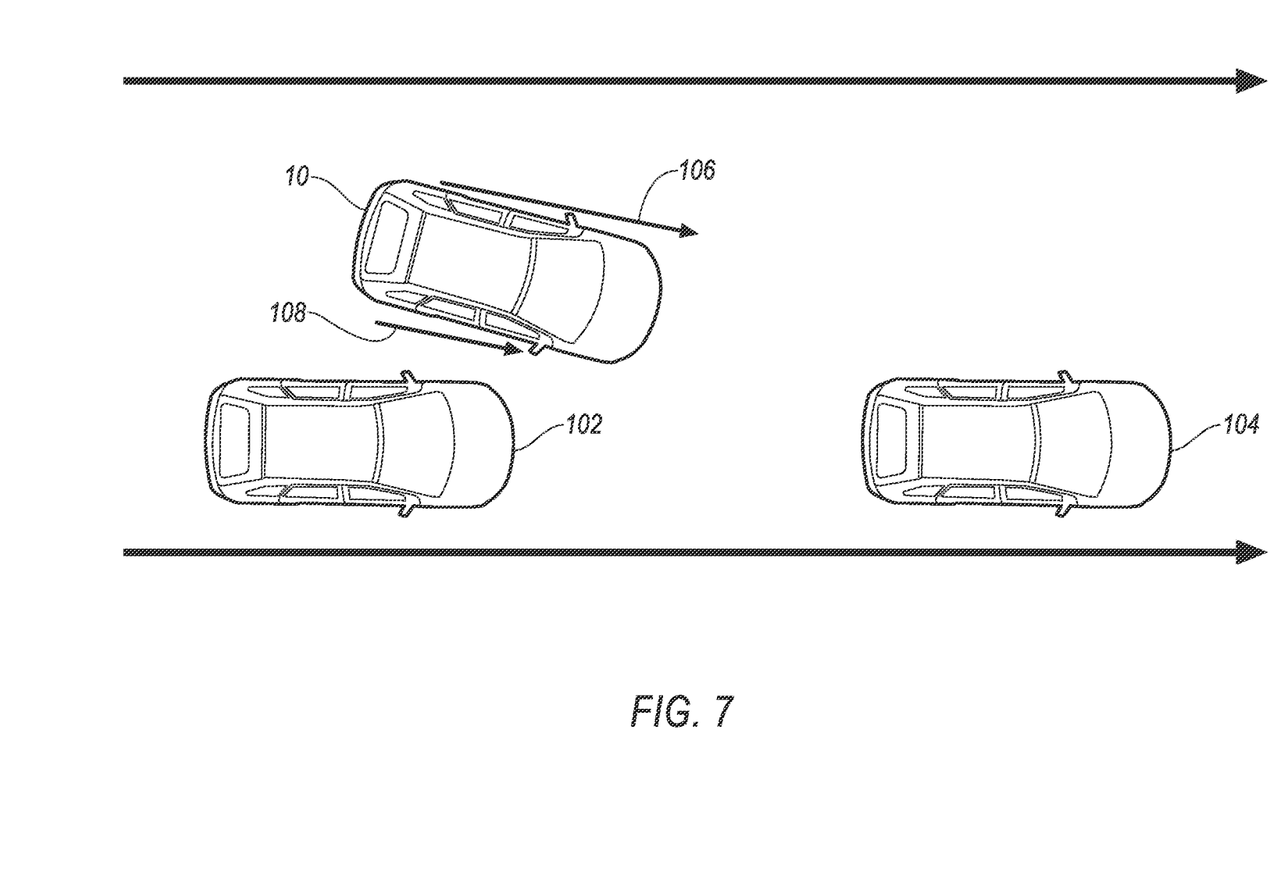
FIG. 7 is an exemplary illustration of an exemplary vehicle approaching a parking spot that may be entered by parallel parking.

A second solution may supplement the above by focusing on one of the factors that influences the rack force values of lines 60 and 62, that factor being the angle $\alpha$ of wheel 14 or the position of rack 24. FIG. 6 illustrates a variation in rack force as a function of steering wheel angle $\alpha$ with a first vehicle velocity greater than zero. Steering wheel angle $\alpha$ may be equated to a position of rack 24 based on the geometry of steering system 12. A first (upper) line 98 of FIG. 6 illustrates a static steering force as a wheel 14 is pivoted from a first angle $\alpha$ equal to −Pmax to a second angle $\alpha$ equal to Pmax when a full rack force of Fmax, equivalent to F2 of FIG. 4, is available. A second (lower) line 100 illustrates a static steering force as the wheel 14 is pivoted from a first angle $\alpha$ equal to Pmax to a second angle $\alpha$ equal to −Pmax when a full rack force of −Fmax is available. When actuator 26 operates in its diminished mode of operation, it may only provide an available diminished rack force of Fmax/2 which may be equivalent to each of F2/2 and F1 of FIG. 4. To limit the maximum rack force to a force below an available rack force of Fmax/2 or above an available rack force of −Fmax/2, the maximum value of a targeted achievable steering angle $\alpha$ may not exceed corresponding a steering wheel angle where lines 98 and 100 are intersected by horizontal lines representing rack forces of Fmax/2 and −Fmax/2 respectively. A parking path or trajectory for vehicle 10 may be generated, taking into consideration lateral movement or turning constraints imposed by limited angular displacement of wheel 14. Such limits result from working within an achievable angle $\alpha$ and an achievable rack position for the rack force available that does not exceed displacements requiring rack forces greater than the available diminished loading from actuator 26. The arrowheads of lines 98 and 100 indicate exemplary relative directions of steering motion. Lines 98 and 100 each are indicative of a restoring force generated by the dynamics of vehicle 10 moving at a velocity greater than zero. If a maneuver cannot be completed at the first vehicle velocity, the vehicle velocity may be increased.

A steering system operating in accord with FIG. 6 may also first determine a rack position of rack 24 needed to execute a maneuver. The ECU then may determine a minimum velocity of vehicle 10, allowing the needed rack position to be reached. The vehicle 10 velocity may be increased to the determined minimum velocity. The rack 24 may be moved to the rack position needed.

A third solution may further supplement the above. Torque vectoring, which as is known allows a differential of the vehicle 10 to supply varying amounts of power to each vehicle 10 wheel, may be used to induce or enhance vehicle lateral movement. Torque vectoring may accordingly be generated by applying uneven wheel torque distribution. Such uneven wheel torque distributions may be generated by providing uneven drive torque distributions to the drive wheel on opposed sides of vehicle 10, developing uneven driving forces on opposite sides of vehicle 10. Torque vectoring may be enhanced by applying uneven wheel brake applications to wheels 14 and 16. Each wheel 14, 16 may have a distinct brake application applied to it, developing uneven braking forces on opposite sides of vehicle 10.

A combination of uneven driving force and uneven braking forces may be more effective at generating yaw-inducing force vectors than either drive torque modulation or brake torque modulation separately, at least for low speed parking maneuvers. Torque vectoring may alternatively be developed using uneven brake application, and providing drive torque to the wheels in an unregulated manner. The uneven brake application allows the drive torque to provide a driving force on one side of vehicle 10 and provides a braking force on the other side of vehicle 10. Such uneven side forces, illustrated with arrows 106 and 108, reduce the required steering rack force and the associated torque from actuator 26 needed to steer vehicle 10. FIG. 6 shows one example where autonomous vehicle 10 is maneuvering to parallel park in a space between vehicles 102 and 104. Torque vectoring as applied in FIG. 6 develops a greater left side driving force 106 than a right side driving force 108. By controlling the torque distribution at each of the four wheels 14, 16, autonomous vehicle 10 may generate yaw rotation that contributes to controlling turns and to lateral movement.

CONCLUSION

An exemplary system and method for using vehicle movement to reduce a steering force needed with a steering actuator that has a diminished operating mode have been disclosed.

As used herein, the adverb "substantially" means that a shape, structure, measurement, quantity, time, etc. may deviate from an exact described geometry, distance, measurement, quantity, time, etc., because of imperfections in materials, machining, manufacturing, transmission of data, computational speed, etc.

With regard to the references to ECUs in the present description, computing devices such as those discussed herein generally each include instructions executable by one or more computing devices such as those identified above, and for carrying out blocks or steps of processes described above. For example, process blocks discussed above are embodied as computer executable instructions.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A system, comprising a computing device that includes a processor and a memory, the memory storing instructions executable by the processor to:
   determine a rack force needed to displace a steering rack of a vehicle;
   determine a rack force available from a steering actuator;

when the force available is less than the force needed, initiate vehicle movement; and
activate the actuator when the vehicle is in motion.

2. A system as claimed in claim 1, wherein the instructions further include instructions to:
determine a relationship between a vehicle velocity and the rack force needed.

3. A system as claimed in claim 2, wherein the instructions further include instructions to:
determine the relationship between the vehicle velocity and the rack force needed as a band having an upper range and a lower range with a spread of the band between the upper range and the lower range depending on environmental factors including road surface characteristics.

4. A system as claimed in claim 3, wherein the instructions further include instructions to:
select a target vehicle speed from an intersection of the rack force available and the band;
increase the vehicle velocity to the target vehicle velocity; and
activate the actuator when the vehicle velocity is at least the target vehicle velocity.

5. A system as claimed in claim 4, wherein the instructions further include instructions to:
check for a displacement of the steering rack responsive to activation of the actuator; and
increase the vehicle velocity when no displacement is detected.

6. A system as claimed in claim 1 wherein the instructions further include instructions to:
determine the rack force needed to displace the rack as a function of a rack position at a first vehicle velocity;
determine an achievable rack position for the rack force available at the first vehicle velocity;
bring the vehicle to the first vehicle velocity;
move the steering rack to the achievable position; and
increase the vehicle velocity when the rack force available is not sufficient to achieve a desired steering rack position.

7. A system as claimed in claim 1 wherein the instructions further include instructions to:
determine a rack position of a rack needed to execute a maneuver;
determine a minimum velocity allowing the rack position needed to be reached;
increase the velocity to the determined minimum velocity; and
move the rack to the rack position needed.

8. A system as claimed in claim 1 wherein the instructions further include instructions to:
apply a torque vector to the vehicle inducing a yaw motion in a desired turning direction.

9. A system as claimed in claim 8 wherein the instructions further include instructions to:
develop the torque vector by applying uneven drive torque to the wheels.

10. A system as claimed in claim 9 wherein the instructions further include instructions to:
develop the torque vector by applying uneven brake torque to the wheels.

11. A method of controlling a vehicle steering system, the method comprising:
determining a rack force needed to displace a steering rack of a vehicle;
determining a rack force available from a steering actuator;
when the force available is less than the force needed, initiating vehicle movement; and
activating the actuator when the vehicle is in motion.

12. A method as claimed in claim 11, further comprising:
determining a relationship between a vehicle velocity and the rack force needed.

13. A method as claimed in claim 12, further comprising:
determining the relationship between the vehicle velocity and the rack force needed as a band having an upper range and a lower range with a spread of the band between the upper range and the lower range depending on environmental factors including road surface characteristics.

14. A method as claimed in claim 13, further comprising:
selecting a target vehicle speed from an intersection of the rack force available and the band;
increasing the vehicle velocity to the target vehicle velocity; and
activating the actuator when the vehicle velocity is at least the target vehicle velocity.

15. A method as claimed in claim 14, further comprising:
checking for a displacement of the steering rack responsive to activation of the actuator; and
increasing the vehicle velocity when no displacement is detected.

16. A method as claimed in claim 11, further comprising:
determining the rack force needed to displace the rack as a function of a rack position at a first vehicle velocity;
determining an achievable rack position for the rack force available at the first vehicle velocity;
bringing the vehicle to the first vehicle velocity;
moving the steering rack to the achievable position; and
increasing the vehicle velocity when the rack force available is not sufficient to achieve a desired steering rack position.

17. A method as claimed in claim 11, further comprising:
determining a rack position of a rack needed to execute a maneuver;
determining a minimum velocity allowing the rack position needed to be reached;
increasing the velocity to the determined minimum velocity; and
moving the rack to the rack position needed.

18. A method as claimed in claim 11, further comprising:
applying a torque vector to the vehicle inducing a yaw motion in a desired turning direction.

19. A method as claimed in claim 18, further comprising:
developing the torque vector by applying uneven drive torque to the wheels.

20. A method as claimed in claim 19, further comprising:
developing the torque vector by applying uneven brake torque to the wheels.

* * * * *